United States Patent [19]
Widmann et al.

[11] Patent Number: 5,331,266
[45] Date of Patent: Jul. 19, 1994

[54] COOPERATIVE DIFFERENTIAL DRIVE SYSTEM

[75] Inventors: Glenn R. Widmann, Simi Valley; Bruce S. Widmann, Canoga Park, both of Calif.

[73] Assignee: Hughes Aircraft Company, Los Angeles, Calif.

[21] Appl. No.: 903,307

[22] Filed: Jun. 24, 1992

[51] Int. Cl.$^5$ .......................... G05B 19/19; B25J 9/12
[52] U.S. Cl. ...................................... 318/625; 318/8; 318/13; 318/568.11
[58] Field of Search ............... 318/8, 9, 10, 11, 12, 318/13, 580, 581, 582, 583, 584, 585, 586, 560, 568.11, 568.12, 625

[56] References Cited

U.S. PATENT DOCUMENTS

| | | |
|---|---|---|
| 1,368,755 | 2/1971 | Roddey . |
| 2,444,171 | 6/1948 | Sanders, Jr. ............... 318/580 |
| 2,469,786 | 5/1949 | Rieber ....................... 318/18 |
| 2,671,869 | 3/1954 | Steele . |
| 2,795,747 | 6/1957 | Wellington et al. ........ 318/13 |
| 2,796,565 | 6/1957 | Walcott, Jr. ............... 318/8 |
| 2,797,374 | 6/1957 | Atton et al. ................ 318/8 |
| 2,994,787 | 8/1961 | Fraser . |
| 3,504,248 | 3/1970 | Miller . |
| 3,559,008 | 1/1971 | Stut et al. .................. 318/8 |
| 4,035,705 | 7/1977 | Miller ........................ 318/564 |
| 4,087,731 | 5/1978 | Rhoades ..................... 318/8 |
| 4,289,996 | 9/1981 | Barnes et al. .............. 318/8 X |
| 5,134,346 | 7/1992 | Schneider et al. .......... 318/8 |

Primary Examiner—Bentsu Ro
Attorney, Agent, or Firm—Randall M. Heald; Charles D. Brown; Wanda K. Denson-Low

[57] ABSTRACT

A cooperative differential drive system (20) for use in material handling and flight control and guidance systems, and the like. The drive system (20) may be employed in application that require high resolution task repeatability capabilities and the execution of precise position and force trajectory path following routines. A differential gear system (24) is driven by two servo-controlled actuators (22, 23) under control of a controller (21). The first actuator (22) is regulated at constant speed while the second actuator (23) is modulated at an appropriately varying speed to achieve a desired drive speed of a load. The second actuator (23) is controlled such that it dos not change rotational direction. Ultimate control of the load is achieved by way of the differential gear system (24) that combines the two actuator speeds to achieve the desired load speed. The differential gear system (24) is optionally coupled by way of a clutch system (25) to the load. The clutch system (25) is engaged after both actuators (22, 23) have reached their nominal operating speeds, thus eliminating actuator start-up problems. Both actuators (22, 23) are kept in constant motion so that they do not operate near their dead-zone region, thus eliminating nonlinearity problems.

9 Claims, 3 Drawing Sheets

COOPERATIVE DIFFERENTIAL DRIVE SYSTEM

BACKGROUND

The present invention relates generally to DC servo systems, and more particularly, to a cooperative differential drive system for use in material handling and flight control and guidance systems.

Many industrial handling systems, such as robot manipulators, numerically controlled machines, servo control systems, and other similar purpose force and position-oriented type devices, utilize a single DC servo motor as a primary drive source to provide mechanical locomotion. These types of electro-mechanical actuators demonstrate nonlinear behavior responses which can be attributed to several nonlinear dynamic effects when the actuator operates near stationary motion. The consequences of operating these single actuator drive systems near the region of their nonlinear disturbances is an overall performance degradation of both the position and force control of the system. In the course of completing a prescribed task, a material handling system often performs a number of operations that require the actuator to experience a transition through this region of nonlinear behavior. Consequently, material handling systems, that utilize the conventional single dedicated actuator drive system, have not been widely applied in complicated assembly tasks that require precise control and execution of both position and force trajectory paths.

Although the use of DC servo motors have become prolific in the robotics industry and other industrial devices, these electro-mechanical devices do however suffer from several restrictive performance disadvantages. Two of these disadvantages involve the following inherent dynamic nonlinearities when the actuator operates in the vicinity close to stationary locomotion.

The first disadvantage is know as the actuator dead zone phenomenon. Since DC motors are mechanical devices, they are often plagued by a variety of dissipative mechanical friction effects such as viscous friction and slip-stick friction. Slip-stick friction presents a particularly disturbing influence towards the actuator performance due to its discontinuous behavior often referred to as a "hard" nonlinearity. As a result, a sufficiently large input signal is needed to be applied before the stiction friction can be overcome and the motion of the actuator shaft can ensue. This phenomenon of a non-responsive output with the application of a significant input is commonly referred to as a dead zone.

The second disadvantage is known as the actuator start-up phenomenon. One of the advantages of using DC motors is that the actuator characteristics tend to be time invariant and linear within the normal operating range. By normal operation, we mean to infer that the actuator is operating in it's designed linear, time invariant region. However, in the initial start-up rotation phase of operation, the actuator system characteristics can be highly nonlinear and time-varying, which can be attributed to enrush currents, and other nonlinear physical phenomena.

These nonlinear dynamics pose a positional degradation to the operational performance of the system. For example, in the course of completing a prescribed task, a material handling system will often perform a variety of "stop and go", "up and down", and "forward and back" positional operations. These types of operations cause the system to experience a dead zone transition whenever the prescribed task requires the drive system to come to a complete stop as a consequence of performing a reversal in direction or when motion is resumed after a waiting period. In addition, when these operations are executed, the actuator is required to operate initially in the nonlinear actuator start-up region of operation. Ultimately, the presence of these nonlinearities results in the system being unable to accurately follow a prescribed position trajectory path. These nonlinear effects are typically further exasperated when the payload to the system is large, which is often the situation in many industrial applications.

Complicated control schemes have been suggested in an attempt to compensate for these undesirable effects. The literature is rich with suggested compensation control schemes. However, very limited success has been achieved in compensating for the so-called hard nonlinearities such as slip-stick friction. In general, these compensation schemes are very involved, computationally intense, and require an exact knowledge of the plant. In many instances, the resulting computed compensated control input signal becomes so unpractically large that neither the system power supplies are not able to achieve it, or the actuator does not have enough dynamic response to respond to the commanded signal. Also it is possible that the resultant system response could further be degraded by the excitation of other nonlinearities present in the system. Thus, for many applications, these nonlinear controller schemes are too impractical to be implemented.

In the past, the degrading effects of these nonlinearities on the performance of material handling systems were not of great concern since these systems tended to be classified as simple position oriented systems. In general, the tasks performed by these systems were of the simple "pick and place" category. These tasks did not require the system to achieve highly accurate endpoint positioning, execute high precision trajectory path following routines, or maintain high resolution task repeatability levels. They generally only needed to meet some coarse, gross positioning requirements. Therefore, as a consequence of the poor position tolerance capability, these simple positioning systems could not dynamically interact with the environment. In the absence of environmental contact requirements, these systems were designed to meet the more important criteria of a stable operation while in the presence of nonlinear dynamics.

Recently, however, there has been considerable interest in utilizing material handling systems that perform a far wider range of flexible operations and have the ability to complete more sophisticated tasks. The envisioned type of tasks that will be performed require the system to execute highly accurate positioning trajectories, and also apply accurate forces to the environment. These types of tasks require the drive system to be much more than a simple positioning type of system, but rather requires it to dynamically perform environmental interactions. For example, these systems might be expected to perform tasks associated with the assembly of a complicated piece of hardware which requires the precise execution of position and force trajectory paths. Consequently, such future systems will dynamically control independently the position alone and the force applied to the environment. This issue of incorporating both position and force control is referred to in the literature as compliant motion control.

The issues and considerations involved in insuring a stable operation for force-controlled systems are often times entirely different than those posed for position-controlled systems, but rather adversely affects the dynamic behavior of the system. Over the years, investigations in the force control of robots have been conducted by a number of researchers. As previously stated, it has been shown that these nonlinear actuator dynamics does not adversely affect the stability of pure position-controlled systems. However, with the additional requirement of incorporating force control strategies in these systems, these aforementioned nonlinear actuator dynamics have become a problematic issue in resolving the system stability. It has been shown that as a consequence of the relatively high stiffness of the encountered environment, the force-controlled systems tend to exhibit highly underdamped behavior with much faster response characteristics compared to equivalent position-controlled systems. Consequently, under certain circumstances, the presence of these nonlinearities have induced surface chattering, limit cycles, and have exhibited other unstable behaviors in typical force-controlled systems. These aberrations are easily explained as the result of the actuator performing numerous "back and forth" operations in order to maintain the applied force. This actuator cogging action exacerbates the situation by causing the actuator to continually transverse the dead zone region. The actuator dead zone transition also introduces an actuator hysteresis force effect that limits the performance of the force-controlled system by not allowing the application of an accurate, repeatable force. As a result, even when a force-controlled system does operates in a stable mode, it is unable to accurately follow a desired force trajectory profile.

Thus it is an objective of the present invention to provide for a drive system that overcomes the limitations of conventional single actuator based drive systems. It is a further objective to provide an improved drive system for material handling and missile flight control systems, and the like, that require high resolution task repeatability capabilities and the execution of high precision position and force trajectory path following routines. It is a further objective to provide an improved drive system that may be used in complicated assembly tasks that require precise control and execution of both position and force trajectory paths.

SUMMARY OF THE INVENTION

In order to achieve these and other features and objectives, the present invention provides for a cooperative differential drive system for use in material handling and missile flight control systems, and the like, that overcomes the disadvantages of conventional approaches. These nonlinearities are due to actuator operation at or near the vicinity of stationary motion. The present differential drive system eliminates some of the inherent nonlinear dynamics associated with conventional drive systems that utilize DC servo actuators as a primary drive source to provide mechanical locomotion. These nonlinear actuator-based dynamics degrade the positioning and force control capabilities of such systems. The present invention eliminates the degrading effects of these non-linearities by avoiding this region of operation by providing a composite system comprised of constantly rotating first actuator and a second actuator that is appropriately modulated mechanically coupled to a load by way of a differential gear system.

Each actuator is separately controlled by means of closed loop control system such that the first actuator is regulated at constant speed while the second actuator is modulated at an appropriately varying speed to achieve a desired drive speed of the load. The second actuator is controlled such that it does not change rotational direction or stop. The desired ultimate motion of the load is achieved by way of the differential gear system that combines the difference in the two actuator speeds to achieve a desired load speed.

A plurality of sensors are coupled in a feedback manner between the actuators and a controller unit that provide feedback control signals to regulate their speeds. A sensor may also be coupled from the differential gear unit to the controller to provide additional control capability and ensure that both actuators are operating at the proper speed. A clutch system is coupled between the differential drive shaft and the output drive shaft of the drive system. The controller unit has a control signal coupled to the clutch system that engages the clutch system after the actuators have achieved the same operating speed and after initial system transients have been overcome. This action causes the output drive shaft to thereafter spin at the same rate as the differential drive output shaft, otherwise the output drive shaft is locked in place.

The present invention thus provides an improved drive system for material handling and flight control systems, and the like, that require high resolution task repeatability capabilities and the execution of precise position and force trajectory path following routines. The improved cooperative differential drive system causes each actuator to be in a constant state of locomotion, thereby avoiding a transition through the idle motion region of operation, while providing accurate motion control over the drive system output shaft. The incorporation of the cooperative differential drive system into a material handling or flight control system eliminates the degrading nonlinear effects and thereby improves the overall position and force control performance of the system.

The present invention may be incorporated into the design of material handling systems for use in an automated manufacturing environment and flight control systems. Since the present invention improves the position and force control performance of the overall robotic system, it aids in the development of sophisticated tasks related to the assembly of complicated parts. A reduction in task development time and increased system productivity may be realized by using the present invention. Consequently, manipulators incorporating the concepts of the present invention become multi-purpose and provide increased flexibility in an automated manufacturing environment. The present invention may be used to improve the positioning of gimbal units within a seeker for a missile system, for example.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

The basic underlying problem with conventional single actuator drive systems is that reduced position and force trajectory tracking performance and induced unstable force behavior can be traced to the nonlinear dynamic effects of the actuator when operating in the vicinity of stationary locomotion. Therefore, by providing a modified drive system that avoids this region of operation, the performance degradation due to these effects can be eliminated. This is provided by a drive system in accordance with the principles of the present invention, and its design is such that it keeps its actuators in a constant state of motion, thus avoiding the degrading nonlinear actuator behavior near idle motion, while providing the desired motion or torque characteristics of the output shaft. These attributes are achieved in a cooperative differential drive system 20 of the present invention.

Figure 1:
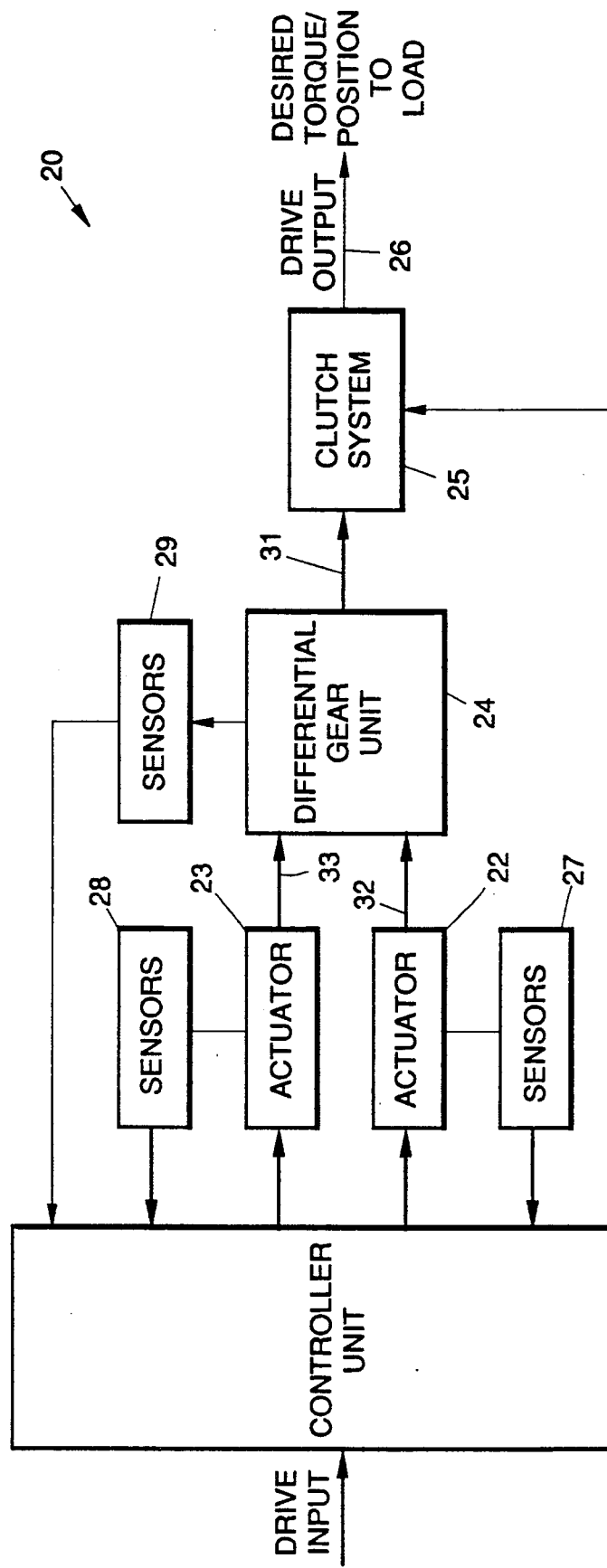
FIG. 1 shows a cooperative differential drive system in accordance with the principles of the present invention.

The design of the cooperative drive system 20 is illustrated in FIG. 1. The drive system 20 is comprised of four major subsystems including a controller unit 21, two actuators 22, 23 that typically comprise DC servo motors, a differential gear unit 24, and a clutch system 25 coupled to an output drive shaft 26 that drives a load. An input signal, representative of the desired motion characteristics of the output shaft, is applied to the controller unit 21, and output signals therefrom are coupled to the two actuators 22, 23. First and second pluralities of sensors 27, 28 respectively couple feedback signals from each of the actuators 22, 23 to the controller unit 21. Output shaft motion 32, 33 from the actuators 22, 23 are coupled to the differential gear unit 24. A third plurality of sensors 29 may be optionally employed to couple a third plurality of feedback signals from the differential gear unit 24 to the controller unit 21. The output of the differential gear unit 24 drives the clutch system 25 that controls the output drive shaft 26 that is coupled to the load. The clutch system 25 is also controlled by the controller unit 21.

The novel aspects of the drive system 20 are that one actuator 22 is operated at a constant speed while the other actuator 23 is operated at a varying nonzero speed and is operated in one direction only. The relative speed of the second actuator with respect to the first actuator speed controls the speed of the output shaft 26. By operating both actuators 23, 23 in one direction, and never changing the direction of their motion, the problems inherent with conventional drive systems are not encountered.

For purposes of completeness, a typical controller unit 21 may be a model 80C196KB microprocessor controller integrated circuit, for example, manufactured by Intel Corporation, that may be readily adapted for use in the present invention. A typical differential gear unit 24 may be a model E7 differential gear set manufactured by RPM Corp., for example. A typical actuator 22, 23 may be a model AS-780D high torque DC servo motor manufactured by Litton Clifton Precision, for example. A typical clutch system 25 may be a model EC15 electric clutch manufactured by RPM Corp., for example. A typical input signals may be provided by an optical encoder such as model HEDS-5500/5540 manufactured by Hewlett-Packard Company, for example.

Furthermore, conventional drive systems have employed differential gears, and such systems are disclosed in U.S. Pat. No. 3,584,429, entitled "Angular Positioning Apparatus for Vehicle Simulator", U.S. Pat. No. 3,559,008, entitled "Voltage Proportional Speed Control of the Output of a Differential Gear Connected to Two Motors Utilizing a Pulse Width Modulator Control", U.S. Pat. No. 2,946,938, entitled "Automatic Control of Industrial Machine Servosystem with Differential Transmitter", U.S. Pat. No. 3,260,133, entitled "Controlled Differential Adjustable Speed Reversing Drive System", U.S. Pat. No. 2,806,191, entitled "Electric Motor Driving Arrangement", and U.S. Pat. No. 2,434,025, entitled "Drive Motors Employing Dual Motors". However, none of these patents disclose the aspects of the present cooperative differential drive system 20 of the present invention.

The operation of the cooperative differential drive system 20 is as follows. The drive system 20 may be adapted for use with material handling systems that requires high resolution task repeatability capabilities and the execution of precise position and force trajectory path following routines. This requires the drive actuators 22, 23 to be in a constant state of rotation, thereby avoiding a transition through their idle motion region of operation, while maintaining motion control of the positional or torque requirements of the system output drive shaft 26. This is achieved using cooperative action by requiring each actuator 22, 23 to continuously rotate within its linear region of operation and using the difference in their speed and direction of rotation to control the motion of the output shaft 26. The differential gear unit 24 is utilized to provide the mechanical interface needed to regulate the motion of the output shaft 26 by blending the respective motions of the two actuators 22, 23. As in the conventional drive system 10, the appropriate sensors 27, 28 feed back sensory information to the controller unit 21 so that a control algorithm may be implemented to supply the appropriate control action to regulate the speeds of the two actuators 22, 23. The controller unit 21 also provides, based on its control logic, the signal to engage/disengage the clutch system 25. When engaged, the output shaft 26 rotates at the same rate as an output shaft 31 of the differential gear unit 24. When disengaged, the output shaft 26 is locked at a stationary position.

The detailed aspects of the present invention will now be described. The differential gear unit 24 is a three member device having two input shafts 32, 33 and one output shaft 31. This unit 24 acts as a simple gear train that adds, subtracts, multiplies, or divides angular movements transmitted to its two input shafts 32, 33 and delivers a blended respective motion at its output shaft 31. The multiply and divide features of the differential gear unit 24 are achieved by selecting appropriate gear ratios of its internal gearing. When the two input shafts 32, 33 are turned in the same direction, the differential gear unit 24 operates as an adder. The differential gear unit 24 performs a subtraction operation when the input shafts 32, 33 are turned in opposite directions. If the two input shafts 32, 33 are turned in the opposite directions at different angular speeds, the output shaft 31 turns in the direction of the more rapidly spinning input with a speed proportional to the difference of the speeds of the input shafts 32, 33. The output shaft 31 does not rotate when the speed of the input shafts 32, 33 are the same, but in opposite directions.

In order to monitor the motion of the differential gear unit 24 and implement the desired control strategy, appropriate sensory information is provided from its output shaft 31 and two input shafts 32, 33. From a theoretical viewpoint, sensors are required for two of the shafts 31, 32, 33, since the information about the third shaft is a direct result of the other two. However, from a practical viewpoint, it is appropriate to measure the motion characteristics of all the shafts 31, 32, 33.

The need to keep each actuator 22, 23 from operating near its dead-zone region requires both actuators 22, 23 to be in constant motion. Consequently, in order for the output shaft 31 of the differential gear unit 24 to execute a complete range of motion (rotating in either direction, or maintain stationary motion) requires the differential gear unit 24 to operate in the subtraction mode. Therefore, the actuators 22, 23 are required to spin in an opposite, but in a cooperative, direction. In this configuration, neither actuator 22, 23 need to reverse directions in order to get the output shaft 31 to rotate in the opposite direction. All that is required is to appropriately change the relative rotational motion between the two actuators 22, 23. This required control action is computed within the controller unit 21 as a result of the drive input signal and sensor signal.

The methodology to implement the control strategy to regulate the motion of each actuator 22, 23 to get a desired relative motion will now be discussed. In order to reduce the complexity of the control strategy and the need to keep computational overhead to a minimum, the control of each actuator 22, 23 satisfies a different control emphasis. The first actuator 22 is designed to rotate at a constant rate well within its linear region of operation. The control of the first actuator 22 is accomplished by placing it within a highly accurate, tight control loop, such as a phase lock loop. The second actuator 23 is also controlled to rotate constantly within its linear range of operation. However, its rate of rotation depends on the difference between the speed of the first actuator 22 and the desired speed of the output shaft 26 of the drive system 20 needed to perform a desired task. The first actuator 22 thus acts as the sole externally controlled actuator of the drive system 20. The first actuator 22 operates with a nominal speed that is equivalent to the speed of the second actuator 23. Therefore, depending on the required motion of the output shaft 26 needed to complete the task, the first actuator 22 either speeds up or slows down accordingly. The differential gear unit 24 thus blends the motion of each actuator 22, 23 in order to deliver a single resultant motion that is proportional to the relative motion difference of the two actuators 22, 23.

The clutch unit 25 is used to restrain the random turning of the system output shaft 26 when the drive system 20 is initially activated or finally deactivated. During the activation phase of operation, the two actuators 22, 23 might speed up asynchronously as they attempt to attain their nominal operating speeds. Consequently, the system output shaft 26 is not directly coupled to the output shaft 29 of the differential gear unit 24, since unpredictable motion of the system output shaft 26 could occur if it was rigidly connected. Therefore, during the activation phase of operation, the system output shaft 26 remains stationary while the two actuators 22, 23 speed up to their nominal speeds. Once these initial system transients have been overcome, the clutch unit 25 is engaged to permit motion of the system output shaft 26 in response to the difference in the speeds of the two actuators 22, 23.

Similar safety precautions need to be addressed with respect to the elimination of uncontrolled motion of the system output shaft 26 during the deactivation phase of operation. During this phase of operation, the two actuators 22, 23 might speed down asynchronously as they achieve stationary motion. Consequently, the clutch unit 25 is disengaged in order to decouple the system output shaft 26 from the differential gear unit output shaft 29. Therefore, during the deactivation phase of operation, the system output shaft 26 remains stationary while the two actuators 22, 23 speed down to the stationary motion.

Figure 2:
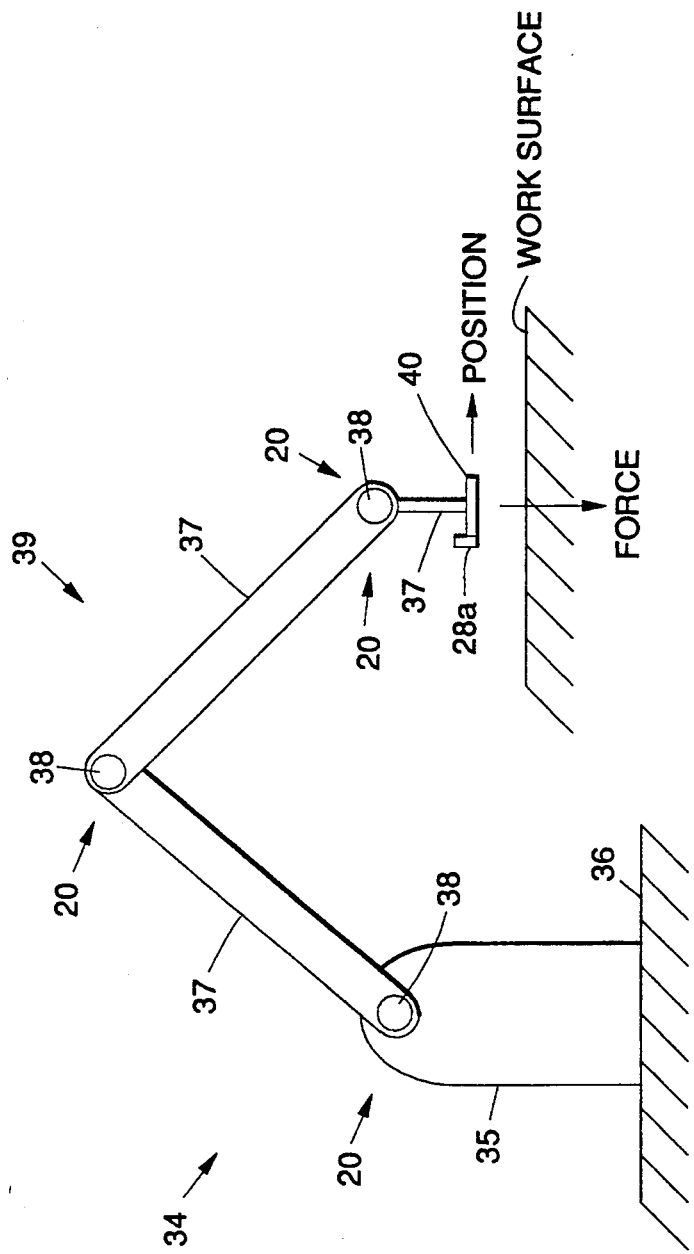
FIG. 2 shows a material handling system that may employ the cooperative differential drive system of FIG. 1.

FIG. 2 shows a material handling system 34 that may employ the cooperative differential drive system 20 of FIG. 1. The material handling system 34 is shown as a multi-link robot 35 having a base 36 three links 37 and three joints 38 that form an extendable arm 39. Each of the joints 38 comprises one cooperative differential drive system 20. The robot 35 is adapted to control both the applied force and position of an end effector 40 disposed at the end of the robot arm 35. A force sensor 28a is attached to the end effector 40 which determines the amount of force applied by the robot 35. The end effector 40 may be a pick-and-place gripper employed to insert integrated circuits into printed circuit boards, for example. The joints 38 may be configured in a revolute (or rotary) form, wherein the output shaft 26 drives the link 37 to a desired position or with a desired force, for example. The robot 35 must be able to control both the position and the force exerted by the end effector 40. This position and force control is achieved by the present cooperative differential drive system 20 in a manner described above.

Figure 3:
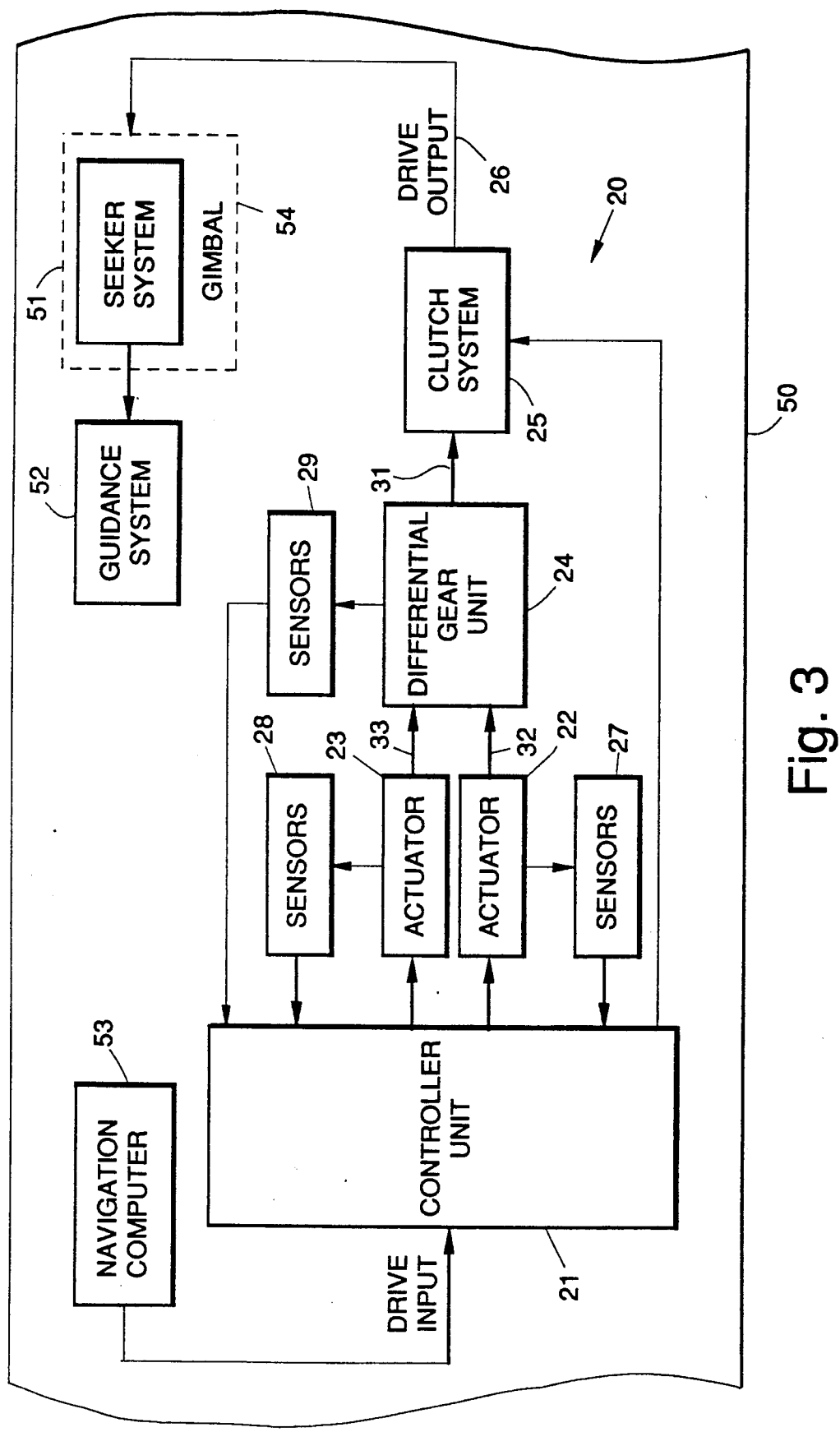
FIG. 3 shows the cooperative differential drive system of FIG. 1 employed in a missile seeker application.

Referring to FIG. 3, it shows the cooperative differential drive system 20 of FIG. 1 employed in a seeker 51 of a missile 50. The seeker 51 is part of a guidance system 52 of the missile 50 and is adapted to control various components on the missile 50 that cause it to fly along a desired trajectory. The drive system 20 is coupled to a navigation computer 53 that applies appropriate input signals that cause the drive system 20 to control the motion of a stabilized gimbal 54 of the seeker 51. Appropriate control signals provided by the navigation computer 53 to the drive system 20 cause a desired motion of the system output shaft 26 to occur, thus causing the gimbal 54 to become positionally stabilized resulting in more accurate position information provided by the seeker 51.

Thus there has been described a new and improved cooperative differential drive system for use in material handling and flight control systems, and the like. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A cooperative differential drive system for controlling the motion of a payload, said drive system comprising:
   a controller;
   a first actuator coupled to the controller for responding to control signals provided thereby, and wherein the control signals cause the first actuator to rotate at a constant rotational rate in a first selected rotational direction;

a second actuator coupled to the controller for responding to control signals provided thereby, and wherein the control signals cause the second actuator to rotate at a selected variable rotational rate in a second selected rotational direction;

a first plurality of sensors coupled between the first actuator and the controller that are employed to control the rotational rate of the first actuator;

a second plurality of sensors coupled between the second actuator and the controller that are employed to control the rotational rate of the second actuator;

a differential gear system coupled between the first and second actuators and the load, wherein said differential gear system is responsive to the respective rotational speeds of the first and second actuators and provides a desired load speed.

2. The drive system of claim 1 further comprising a clutch system coupled between the differential gear system and the load, and wherein said controller has a control signal coupled to the clutch system for engaging the clutch system after the first and second actuators have achieved their respective operating speeds and after initial system transients have been overcome.

3. The drive system of claim 1 further comprising:
a third plurality of sensors coupled between the differential gear system and the controller.

4. The drive system of claim 1 wherein the controller is adapted to cause the first and second actuators to rotate within respective linear regions of operation and wherein the difference in their respective rotational speeds is used to control the rotation of the differential gear system.

5. The drive system of claim 1 wherein the first and second actuators each comprise a DC servo motor.

6. A cooperative differential drive system for controlling the motion of a payload, said drive system comprising:
a controller;
a first actuator coupled to the controller for responding to control signals provided thereby, and wherein the control signals are adapted to cause the first actuator to rotate at a constant rotational rate in a first selected rotational direction;

a second actuator coupled to the controller for responding to control signals provided thereby, and wherein the control signals are adapted to cause the second actuator to rotate at a selected variable rotational rate in a second selected rotational direction;

a first plurality of sensors coupled between the first actuator and the controller that are employed to control the rotational rate of the first actuator;

a second plurality of sensors coupled between the second actuator and the controller that are employed to control the rotational rate of the second actuator;

a differential gear system coupled between the first and second actuators and the load, wherein said differential gear system is responsive to the respective rotational speeds of the first and second actuators and provides a desired load speed; and a clutch system coupled between the differential gear system and the load, and wherein said controller has on control signal coupled to the clutch system for engaging the clutch system after the first and second actuators have achieved their respective operating speeds and after initial system transients have been overcome.

7. The drive system of claim 6 further comprising:
a third plurality of sensors coupled between the differential gear system and the controller.

8. The drive system of claim 6 wherein the controller provides a means for causing the first and second actuators to rotate within respective linear regions of operation and wherein the difference in their respective rotational speeds is used to control the rotation of the differential gear system.

9. The drive system of claim 6 wherein the first and second actuators each comprise a DC servo motor.

* * * * *